(12) United States Patent
Daum et al.

(10) Patent No.: US 6,665,384 B2
(45) Date of Patent: Dec. 16, 2003

(54) METHODS AND APPARATUS FOR APPLIANCE COMMUNICATION INTERFACE

(75) Inventors: Wolfgang Daum, Louisville, KY (US); Robert Marten Bultman, Smithfield, KY (US); John Steven Holmes, Sellersburg, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,841

(22) Filed: Jun. 14, 2001

(65) Prior Publication Data

US 2002/0097851 A1 Jul. 25, 2002

Related U.S. Application Data

(60) Provisional application No. 60/212,460, filed on Jun. 19, 2000.

(51) Int. Cl.[7] .............................................. H04M 11/00
(52) U.S. Cl. ............................. 379/102.03; 379/102.01; 717/168
(58) Field of Search ................. 379/102.01–102.03, 379/102.07, 106.01, 93.05–93.08, 93.01, 93.28, 93.29; 709/223, 224, 200, 206; 717/162, 167, 168; 219/714; 340/825

(56) References Cited

U.S. PATENT DOCUMENTS

| 4,403,111 | A | * | 9/1983 | Kelly ....................... 379/93.05 |
|---|---|---|---|---|
| 4,665,544 | A | | 5/1987 | Honda et al. |
| 4,829,560 | A | | 5/1989 | Evanyk et al. |
| 5,268,811 | A | | 12/1993 | Maeda |
| 5,460,006 | A | | 10/1995 | Torimitsu |
| 5,629,898 | A | | 5/1997 | Idei et al. |
| 5,852,658 | A | * | 12/1998 | Knight et al. ............ 379/93.07 |
| 5,877,957 | A | | 3/1999 | Bennett |
| 5,909,183 | A | | 6/1999 | Borgstahl et al. |
| 5,956,487 | A | | 9/1999 | Venkatraman et al. |
| 6,003,070 | A | | 12/1999 | Frantz |
| 6,009,153 | A | * | 12/1999 | Houghton et al. ..... 379/102.02 |
| 6,080,972 | A | * | 6/2000 | May ........................... 219/714 |
| 6,112,127 | A | | 8/2000 | Bennett |
| 6,256,378 | B1 | * | 7/2001 | Iggulden et al. ....... 379/102.02 |
| 6,405,244 | B1 | * | 6/2002 | Bando et al. ............... 709/206 |
| 6,467,084 | B1 | * | 10/2002 | Howard et al. ............. 709/223 |

FOREIGN PATENT DOCUMENTS

WO     WO 90/15394     * 12/1990

* cited by examiner

*Primary Examiner*—Wing Chan
(74) *Attorney, Agent, or Firm*—H. Neil Houser, Esq.; Armstrong Teasdale, LLP

(57) ABSTRACT

A method for changing a control program that controls at least some operations of an appliance is provided. The appliance includes at least one electronic control that executes the control program. The method includes connecting the electronic control to a communication device configured to communicate with at least one user device via a network. The method also includes changing the control program via the user device and the network.

36 Claims, 6 Drawing Sheets

METHODS AND APPARATUS FOR APPLIANCE COMMUNICATION INTERFACE

CROSS REFERENCE TO RELATED APPLICATIONS

This application claims the benefit of U.S. Provisional Application No. 60/212,460, filed Jun. 19, 2000.

COPYRIGHT STATEMENT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

This invention relates generally to electronic appliance controls and, more particularly, to reconfigurable control systems for electronically controlled appliances.

At least some known appliances include an electronic appliance control that is programmed by a manufacturer i.e., originally programmed. An appliance owner desiring to upgrade an electronic appliance control has had little choice but to replace the entire appliance. However, replacing the appliance in order to obtain the benefits of an upgraded electronic control and/or upgraded programming for the control is typically not cost effective.

SUMMARY OF INVENTION

In one aspect, a method for changing a control program that controls at least some operations of an appliance is provided. The appliance includes at least one electronic control that executes the control program. The method includes connecting the electronic control to a communication device configured to communicate with at least one user device via a network. The method also includes changing the control program via the user device and the network.

In another aspect, a method for operating an appliance controlled by a dedicated appliance controller interfacing with an appliance communication controller is provided. The appliance communication controller is configured to interpret and transmit control data for operating the appliance to the dedicated appliance controller. The appliance communication controller is connected to a modem. The method includes establishing a communication link with the appliance communication controller using the modem and supplying control data to the appliance communication controller using the communication link.

In yet another aspect, a communication interface for operating an appliance controlled by a dedicated appliance controller is provided. The interface includes an appliance communication controller interfacing with the dedicated appliance controller and an external host controller interfacing with the appliance communication controller and configured to receive control data from an operator.

DETAILED DESCRIPTION

Figure 1:
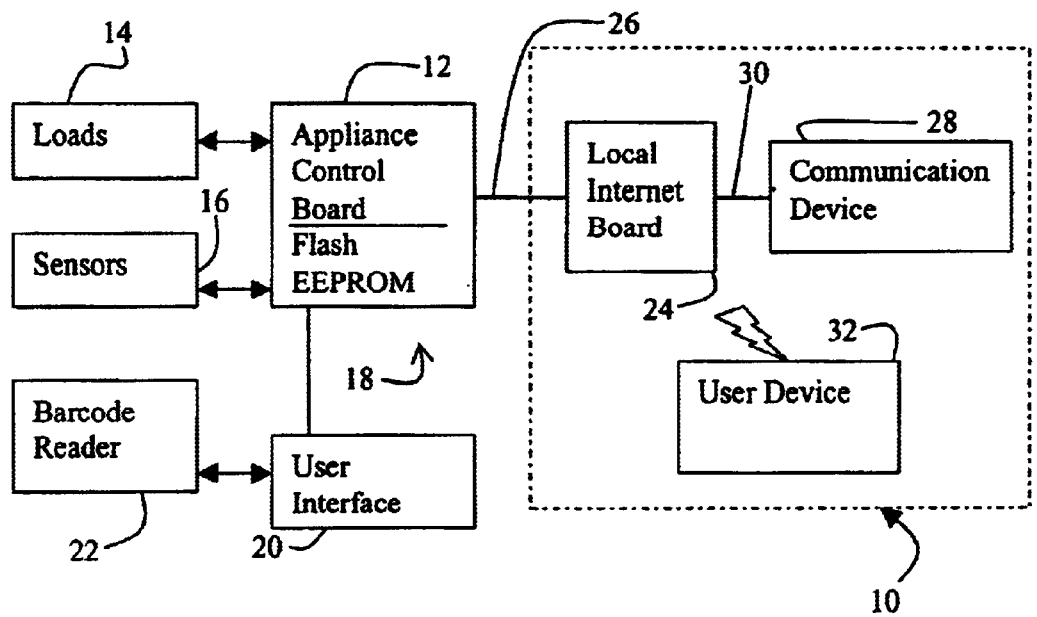
FIG. 1 is a block diagram of one embodiment of a communication interface for an electronically controlled appliance.

FIG. 1 is a block diagram of one embodiment of a communication interface 10 for an electronically controlled appliance including, but not limited to, refrigerators, ovens, ranges, dishwashers, microwaves, washing machines, and dryers. The appliance includes an electronic control 12 connected to loads 14 and sensors 16 for the appliance. Electronic control 12 executes a control program and controls at least some operations of the appliance, such as, for example, a refrigerator/freezer automatic defrost and door-open signaling are programmed. In one embodiment, Electronic control 12 includes a FLASH EEPROM 18 in which the control program is stored. Electronic control 12 also is connected to a power supply (not shown) and a user interface 20. User interface 20 is connected to a data input device 22 such as a barcode reader accessible by an appliance user for inputting messages to electronic control 12 relating to such functions as inventory control. As described below, the user is, for example, but not limited to, an owner of the appliance, a manufacturer of the appliance, or a repairperson or a service person. In one embodiment, user interface 20 also includes a display (not shown) that displays, for example, a temperature of the appliance. Interface 20, in another embodiment, also allows the user to enter commands to enable or disable Internet access to electronic control 12 as further described below.

Interface 10 includes a local Internet board 24 that, in one embodiment, includes a micro-controller having at least one megabyte of capacitor-backup RAM (not shown) and at least one megabyte of FLASH EEPROM (not shown). In an exemplary embodiment, board 24 is a Hitachi model H8S board commercially available from Hitachi, Ltd., Tokyo, Japan. Other known micro-controllers can be employed. Board 24 is operationally connected to electronic control 12. In an exemplary embodiment, board 24 is connected to electronic control 12 by a serial interface 26 that transmits at 9600 baud according to an Electronic Industries Association (EIA) RS-232 protocol. Board 24 is also operationally connected to a communication device 28 via an interface 30. Interface 30, in one embodiment, transmits at 9600 baud under EIA RS-232 protocol.

In one embodiment, communication device 28 is a modem and hereafter is sometimes referred to as modem 28. In an exemplary embodiment, modem 28 is a 56-kilobit-per-second modem configured to line drop on line pickup detection. In other words, if a user picks up a telephone on the same telephone line as modem 28, then modem 28 drops the line so as not to interfere with the user's use of the line. In an exemplary embodiment, modem 28 connects to the Internet via an RJ11 telephone connection. In an alternative embodiment, modem 28 connects to the Internet other than via a telephone connection, such as, but not limited to, a cable connection and a satellite connection. Modem 28 can be infrared modulator/demodulator, a radio frequency (RF) modulator/demodulator, or an acoustical modulator/demodulator. As those with ordinary skill in the art well know, the capitalized term "Internet" refers to the collection of networks and routers that use the Transmission Control Protocol/Internet Protocol (TCP/IP) to communicate with one another. Additionally, although described in terms of the Internet, another wide area network or even a local area network can be used.

Board 24 operates via firmware such as Jini and/or Java, commercially available from Sun Microsystems, Inc., Palo Alto, Calif., emWare, commercially available from emWare, Inc., Salt Lake City, Utah, or via a kernel developed specifically for a particular embodiment. Board 24 receives, via modem 28, input data. In an exemplary embodiment, the data is in HyperText Markup Language (HTML) script format from a user via a remote user device 32. In an exemplary embodiment, remote user device 32 is a remote computer connected to the Internet, and hereafter is referred to as computer 32. Computer 32 accesses the Internet using an Internet browser program, such as, for example, but not limited to, Netscape which is commercially available from the Netscape Communications Corporation, Mountain View, Calif.

In another embodiment, a remote manufacturer of the appliance accesses modem 28 via the Internet and transmits data to board 24 for upgrading appliance controls. In yet another embodiment, the user communicates with board 24 via a stand-alone local computer (not shown in FIG. 1) connected to interface 30.

Board 24 requests data, such as temperature data in one embodiment, from electronic control 12 and stores the data for access by the user. Board 24 also provides security for memory page control, firmware upgrade, and control command transmission. In one embodiment, board 24 sends a pager message to the user via modem 28 to indicate an alarm condition, such as, for example, an open door condition and/or a need for water filter maintenance.

Figure 2:
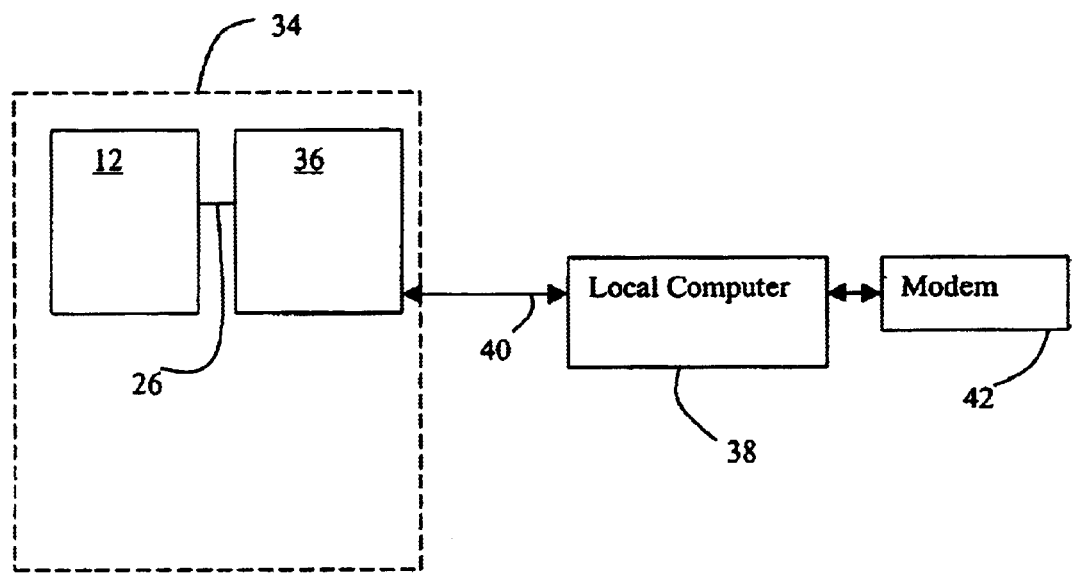
FIG. 2 is a block diagram of a second embodiment of a communication interface.

Another embodiment of communication interface 34 for an appliance is shown in FIG. 2. Communication interface 34 includes electronic control 12, and a level-shift option board 36 is coupled to electronic control 12 via control board serial interface 26. Interface 26 is connected to a local computer 38 via a wired serial interface 40. The term local computer, as used herein, refers to single stand-alone computers and to distributed network computers. Computer 38 is located in a building in which the appliance is located or is otherwise proximate to the appliance. Communication between electronic control 12 and computer 38 is at 9600 baud using EIA RS-232 protocol over interfaces 26 and 40.

Computer 38 is programmed to perform functions described above as performed by Internet board 24 in the embodiment described in FIG. 1, and accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits. Application software for appliance maintenance and upgrade is downloaded from a manufacturer via the Internet and a modem 42 onto computer 38. For example, when an appliance control programming is to be upgraded, an upgrade HTML script is downloaded from the manufacturer to computer 38, which processes the HTML script using the application software and transmits upgrade data to electronic control 12. Accordingly, a programming of an originally programmed electronic control is changed.

Figure 3:
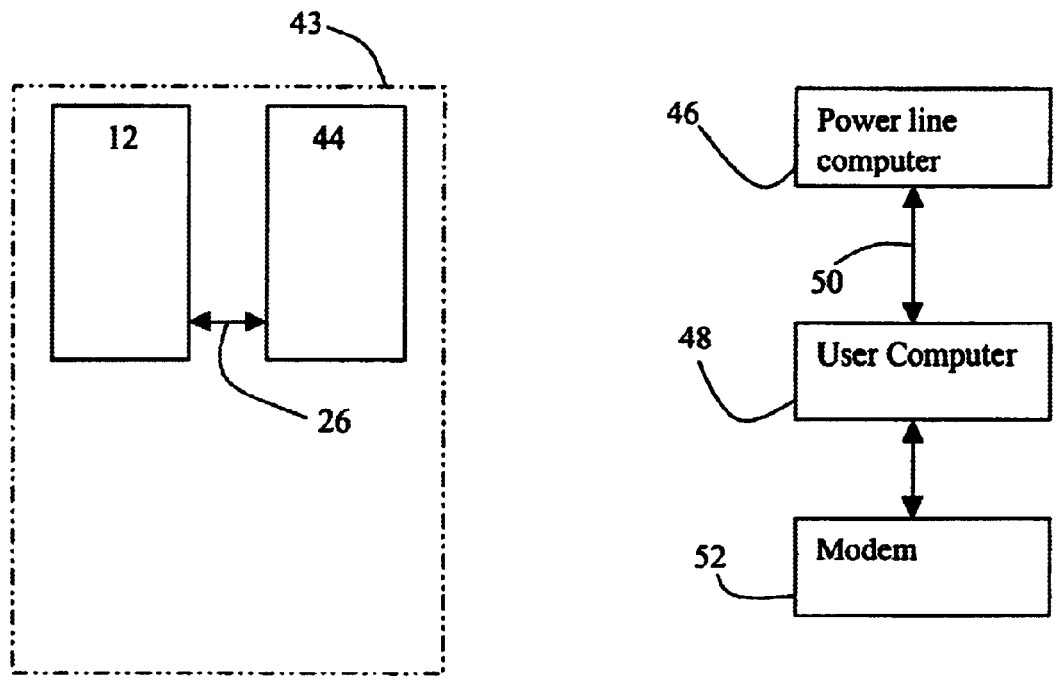
FIG. 3 is a block diagram of a third embodiment of a communication interface.

Yet another embodiment of a communication interface 43 is shown in FIG. 3 and includes electronic control 12. Interface 43 is expandable to include additional appliances for networking. More specifically, electronic control 12 is connected to a Power Line Carrier (PLC) bridge 44 via control board serial interface 26. Bridge 44 connects interface 26 to a power line computer 46 via another PLC bridge (not shown) in computer 46. The phrase power line computer means any computer configured to communicate via an alternating current (AC) power line. In one embodiment, computer 46 and electronic control 12 communicate using a power line carrier protocol, such as, for example, but not limited to, an X10 protocol.

Power line computer 46 interfaces with a computer 48 via an EIA RS-232 interface 50. Computer 48 connects to the Internet via a modem 52. Functions described above as being performed by Internet board 24 (shown in FIG. 1) are performed by power line computer 46. In one embodiment, computers 46 and 48 are both located in a home of an appliance owner, and the owner controls an appliance (not shown) locally using computer 46. In another embodiment, additional appliances (not shown) having at least one control linked to a PLC bridge also interface with computer 46 via PLC protocol. Thus, a homeowner is able to configure a number of home appliances for local control via computer 48 and/or remote control via the Internet and modem 52.

Figure 4:
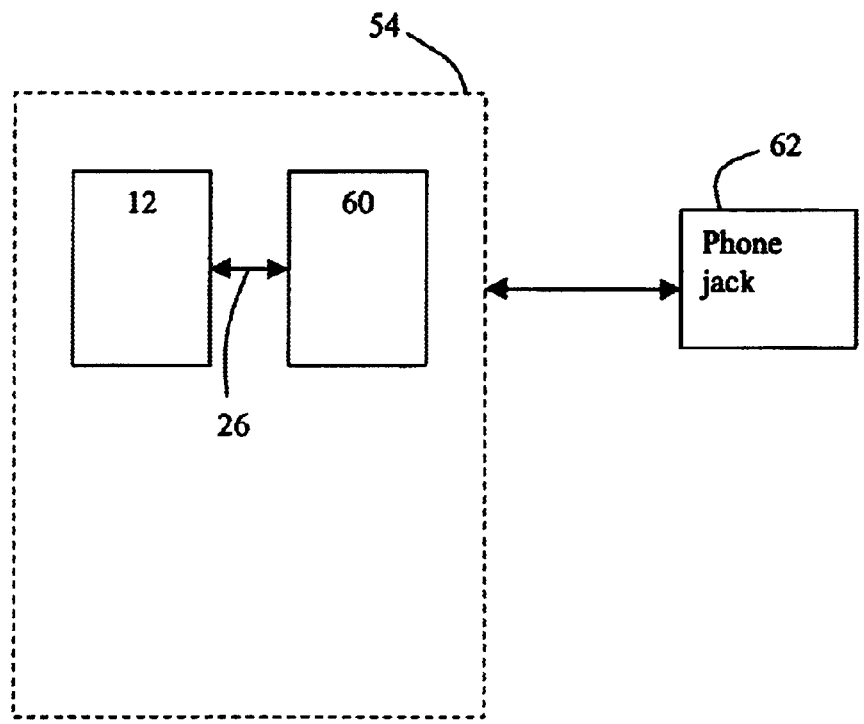
FIG. 4 is a block diagram of a fourth embodiment of a communication interface.

FIG. 4 illustrates another embodiment of a communication interface 54 including electronic control 12. A modem bridge 60 is connected to control board interface 26 and is wired to an RJ11 telephone jack 62. An external computer (not shown), such as, for example, but not limited to, a remote computer operated by a manufacturer, accesses electronic control 12 via the Internet. In the present embodiment, functions described above as being performed by Internet board 24 (shown in FIG. 1) are performed by the remote computer. In another embodiment, a local computer (not shown), such as a personal home computer, is connected to an additional serial (e.g. EIA RS-232 protocol) access port (not shown) in electronic control 12. An owner of an appliance (not shown) thus controls the appliance locally using the home computer. Additionally, a repair person is able to utilize the local computer to perform diagnostic tests on the appliance.

Figure 5:
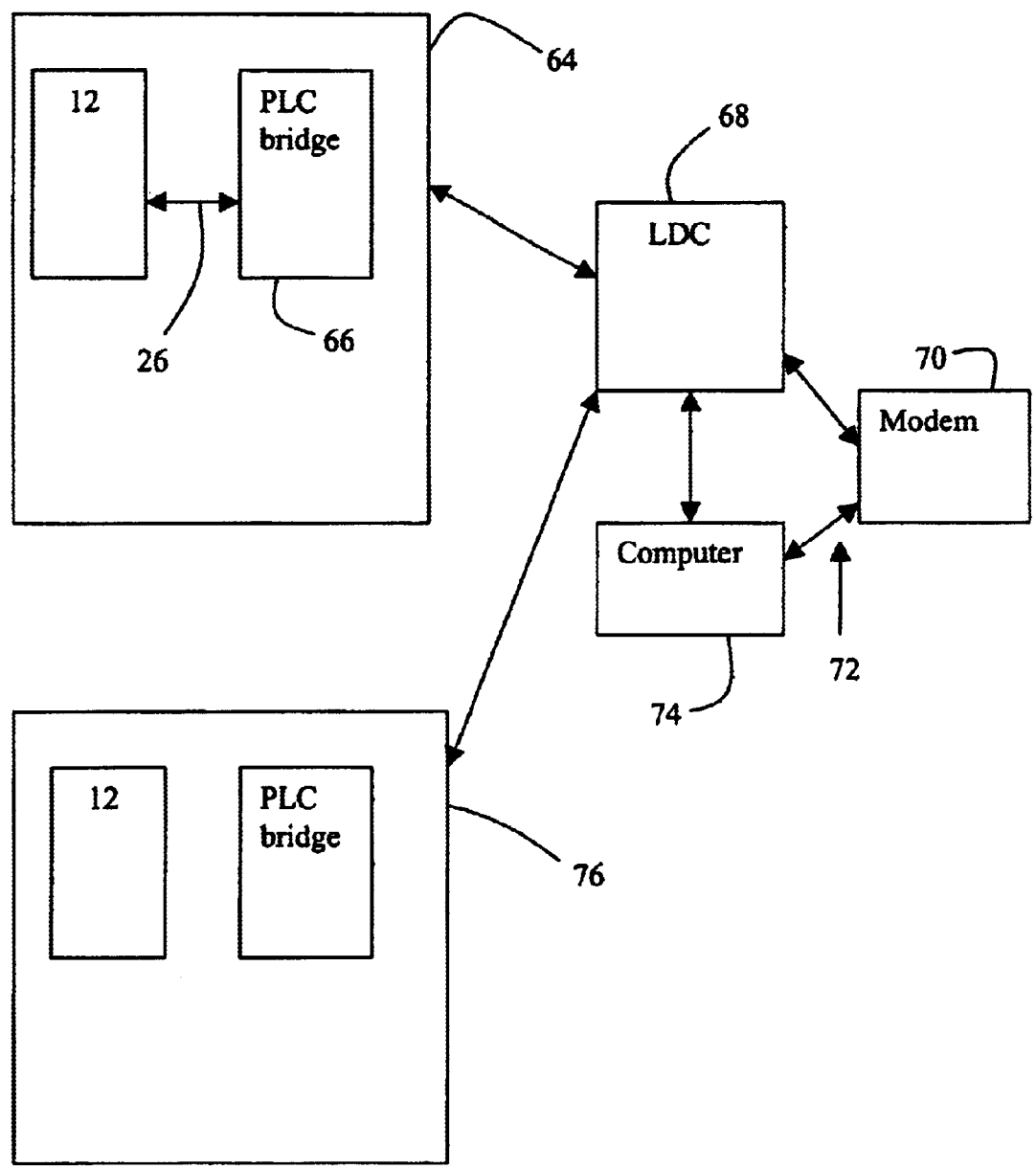
FIG. 5 is a block diagram of a fifth embodiment of a communication interface.

FIG. 5 is a diagram of yet another embodiment of a communication interface 64 including electronic control 12 (shown in FIG. 1). Interface 64 is expandable to include additional appliances for networking. Like the embodiment shown in FIG. 3, communication interface 64 includes a PLC bridge 66 connected to electronic control 12. Bridge 66 connects an appliance (not shown) to a local data concentrator 68. Local data concentrator 68 is coupled to a modem 70 and, via an RS-232 interface 72, to a personal computer 74 that also is connected to modem 70. An additional appliance 76 also interfaces with local data concentrator 68 via PLC protocol.

Figure 6A:
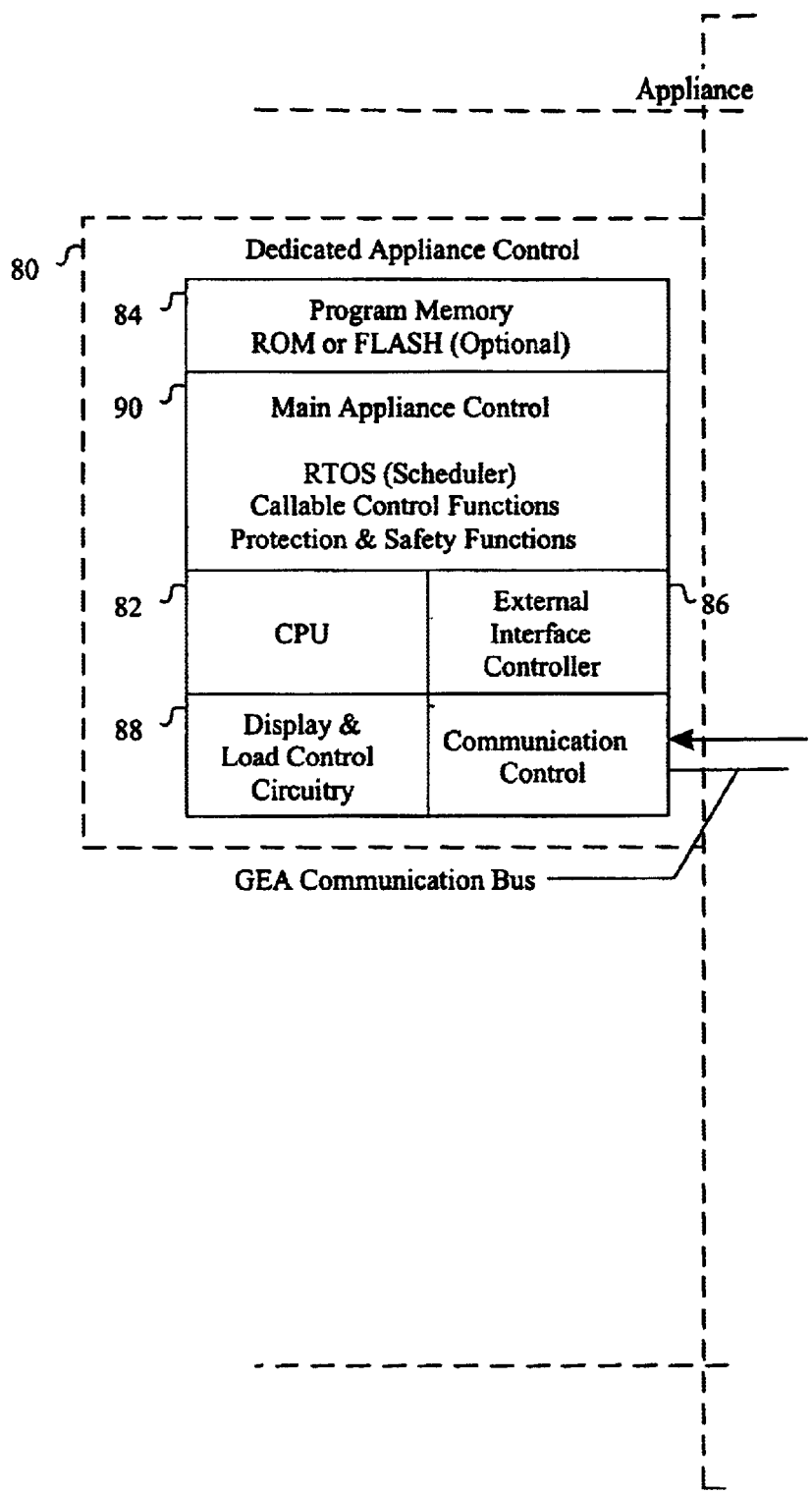
FIGS. 6A, 6B and 6C are a block diagram of an embodiment of a communication interface.
Figure 6B:
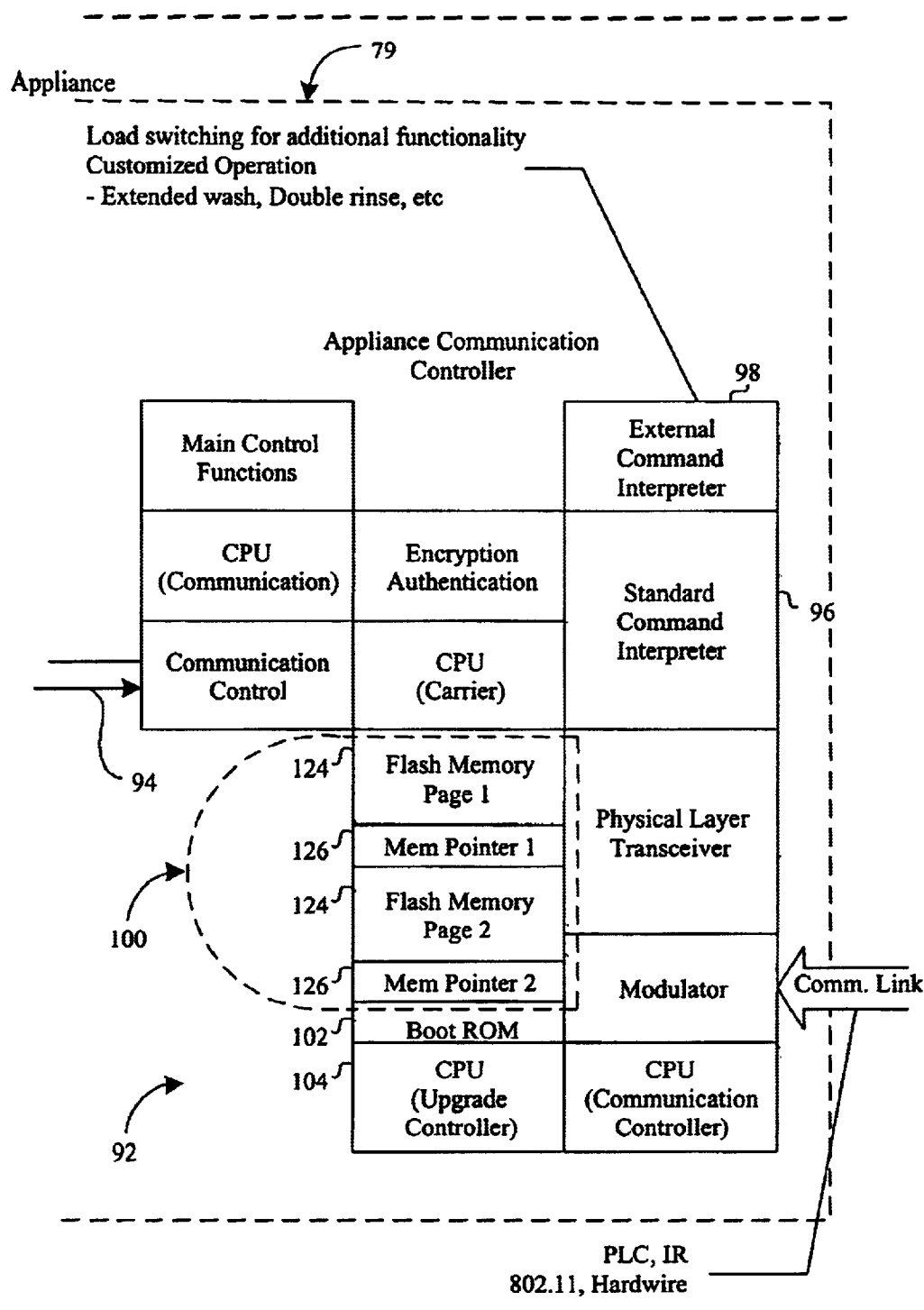
Figure 6C:
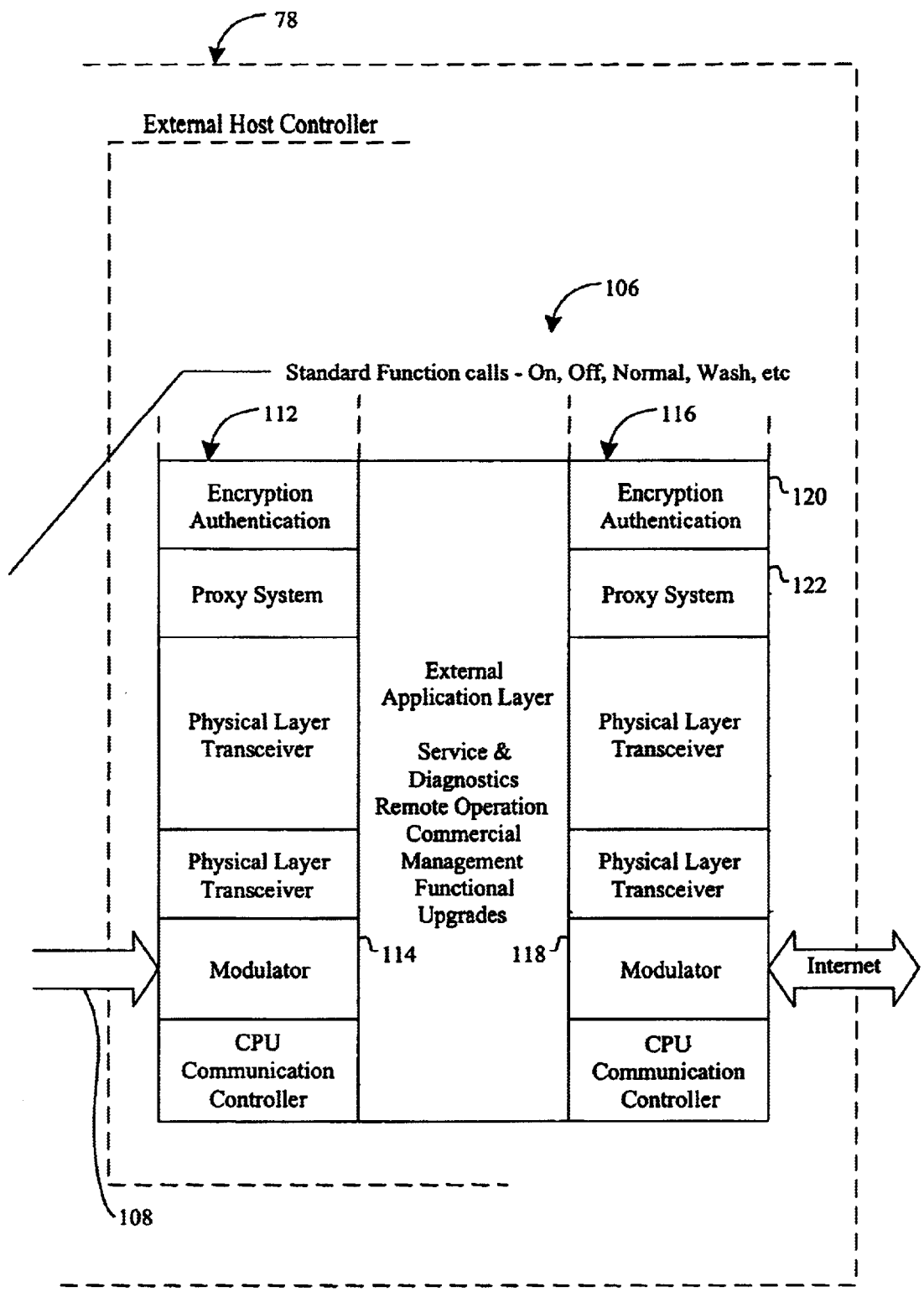

FIG. 6 illustrates still another embodiment of a communication interface 78 between an appliance 79 and the appliance user or operator. As described above, the user is, for example, an owner of appliance 79 or, in another embodiment, a manufacturer of appliance 79 or a service person. In one embodiment, appliance 79 is a refrigerator operated via a dedicated appliance control 80. In one embodiment, dedicated appliance control 80 is a processor physically contained within appliance 79. As used herein, the term processor is not limited to just those integrated circuits referred to in the art as processors, but broadly refers to computers, processors, microcontrollers, microcomputers, programmable logic controllers, application specific integrated circuits, and other programmable circuits. Dedicated appliance controller 80 includes a central processing unit (CPU) 82, a local program memory 84 including at least one of a RAM memory, a ROM memory, and a FLASH memory. Dedicated appliance controller 80 also includes an external interface controller 86 including relays and sensors (not shown). In an exemplary embodiment, dedicated appliance controller 80 also includes a user interface 88 including at least one display and one or more switches (not shown), and an appliance control application program 90. Application program 90 can be reprogrammed and/or directed to perform specific functions via user commands to dedicated appliance controller 80 via interface 78.

Interface 78 includes an appliance communication controller 92. In one embodiment, appliance communication controller 92 is a processor physically contained within appliance 79. In an alternative embodiment, appliance communication controller 92 is physically located outside appliance 79. Appliance communication controller 92 interfaces with dedicated appliance controller 80 via a communication bus 94. Bus 94, in one embodiment, is a parallel bus, such as, but not limited to, a Centronics parallel interface.

In another embodiment, bus 94 is a one-line serial Transistor-Transistor logic (TTL) interface transmitting asynchronously at 9600 baud. Bus 94 allows on-demand communications in a multi-master environment. A communication standard for bus 94 does not imply that any more than two devices need be present to communicate. A number of devices that can be placed on bus 90 is not limited beyond limits set by a particular bus physical addressing scheme.

In embodiments in which the appliance includes more than one dedicated appliance controller 80, an arbitration scheme is included in bus 94 to allow communication by all such dedicated appliance controllers over bus 94 without data transmission collisions. More particularly, and in one embodiment, an interrupt-driven, byte-oriented collision detection protocol is used which can detect collisions occurring when two or more masters attempt to use bus 94 at the same time.

For example, a physical layer of a communication subsystem utilizes a collision detection scheme to determine when a communication port is free (not in use) or not free (in use) and a data collision has occurred. The communication subsystem utilizes a byte-oriented protocol according to Table 1.

TABLE 1

| State | Action | Result | Next State |
|---|---|---|---|
| 1 | Are there bytes to send? | Yes No | 2 1 |
| 2 | Check bus | Busy Free | 6 3 |
| 3 | Send byte | | 4 |
| 4 | Does sent byte equal byte received | Yes No | 1 5 |
| 5 | Delay 3 to 8 byte times | Complete | 1 |
| 6 | Delay 5 byte times | Complete | 1 |

In the two delay states (5 and 6), a byte time is defined as an amount of time required to transmit a single byte on the bus. The variable delay in state 5 causes the resent delay to vary which means that if a collision occurred (i.e., two masters transmitted at approximately the same time) then each master will likely retransmit at different times depending on state 5. Otherwise, with a non-variable state 5, the two masters would continue to collide their respective transmissions.

Additionally, a data link layer of a communication subsystem defines data that moves across a bus in any particular packet. For a multi-master environment, one device is a master during one communication cycle and that device is a slave during another communication cycle. One implementation of a data link layer utilizes a packet as set out in Table 2.

TABLE 2

| STX | Address | Packet Length | Command | Data | CRC | ETX |
|---|---|---|---|---|---|---|
| 1 byte | 1 byte | 1 byte | 1 byte | N bytes | 2 bytes | 1 byte |

Referring to Table 2, STX is a start of transmission flag with a value of 0x02. Address is an address for an intended listening device that will utilize the data. Packet length is seven plus N (the number of data bytes). CRC refers to cyclic redundancy check, and, to reduce the number of calculations, a look up table is utilized. ETX refers to an end of transmission flag with a value of 0x03. Acknowledgements (ACKs) and non-acknowledgements (NAKs) are utilized with a packet according to Table 2. For example, after the intended recipient of a packet receives a STX and its address, the recipient responds with an ACK. The transmitting device waits for the ACK before sending the packet length. The recipient waits 200 milliseconds after an expected event before sending a NAK. The recipient sends a first ACK upon receipt of an ETX and a second ACK upon a correct CRC check which is not performed until after receipt of the ETX.

Referring to FIG. 6, appliance communication controller 92 includes a standard command interpreter 96, an extended command interpreter 98, a flash memory 100, a boot ROM 102, and an upgrade controller 104. Appliance communication controller 92 also interfaces with an external host controller 106, a processor located, in one embodiment, in a home in which the appliance is located. Appliance communication controller 92 interfaces with external host controller 106 via a communication link 108. Link 108, in one embodiment, is a power line carrier interface. Link 108 can be implemented as an infrared connection, using an Institute of Electrical and Electronic Engineers (IEEE) Standard 802.11, or as a hardwire connection.

External host controller 106 receives control data including, for example, but not limited to, operational commands and/or code for reprogramming application program 90, from the user via the Internet. Communication link 108, in another embodiment, links additional appliances to external host controller 106. For example, laundry, refrigeration, and cooking appliances are networked as further described below.

External host controller 106 includes an interface 112 including a communication port 114 that allows entry of appliance control data by the user from a single location, e.g. a stand-alone personal computer connected to port 114. Using the control data entered by the user, external host controller 106 generates instructions to operate or modify control of the appliance and transmits the instructions to appliance communication controller 92. Similarly, where the user enters control data for operating an additional networked appliance linked to interface 108 as described above, external host controller 106 generates and transmits instructions to an appliance communication controller for the additional appliance.

External host controller 106 also includes a gateway interface 116 including a high-speed communication port and/or modem 118 for communication. Thus, external host controller 106 is accessible from wherever Internet access is available and when data encryption algorithms 120 and proxy protocols 122 are satisfied. In one embodiment, a remote factory or service center performs diagnostics and function upgrades to application program 90 for the appliance using the Internet.

Appliance communication controller 92 uses standard command interpreter 96 to interpret instructions received from external host controller 106. Appliance communication controller 92 accepts low-level function commands, e.g. commands such as On, Off, Status, and Function Selection that are natively interpreted by dedicated appliance controller 80, and communicates them to dedicated appliance controller 80. Depending on a command originating format, appliance communication controller 92 converts the command into a dedicated appliance controller machine-specific format before transmitting it to dedicated appliance controller 80. In another embodiment, appliance communication controller 92 uses extended command interpreter 98 to implement new algorithms and functions using the low-level commands. That is, low-level commands that directly control loads of the appliance are used as building blocks to perform new functions. More specifically, the user enters an extended command, e.g. for a customized timing and temperature setting. Extended command interpreter 98 then converts the command into low-level commands and transmits them to dedicated appliance controller 80.

When it is desired to change an original programming of dedicated appliance controller 80, appliance communication controller 92 performs buffering using memory pages 124. More particularly, a new application program is received via link 108, stored in one of memory pages 124 and checked for syntax errors. Appliance communication controller 92 then queries the state of dedicated appliance controller 80 to ensure that no upgrading is performed during use of dedicated appliance controller 80. At a time when dedicated appliance controller 80 is not in use, appliance communication controller 92 begins transmitting new application program 90 to dedicated appliance controller 80. During the transmission process, appliance communication controller 92 monitors, e.g. maintains a pointer 126 to, the data stream being transmitted, and continues to monitor dedicated appliance controller 80 use, and halts transmission if dedicated appliance controller 80 is in use. If an upgrade is interrupted by dedicated appliance controller 80 use, it is resumed subsequently from where it had been interrupted by using pointer 126.

In another embodiment, appliance communication controller 92 is used to obtain information relating to appliance operation, e.g. data pertaining to maintenance and scheduling and, for commercial applications, usage tracking and financial accounting. For example, appliance communication controller 92 accumulates such data until it is uploaded to a remote host (not shown) for analysis.

In an alternative embodiment, appliance communication controller 92 performs as a master with dedicated appliance controller 80 as slave to implement a new application program 90. New program 90 is not downloaded to dedicated appliance controller 80 but is retained and executed from appliance communication controller 92 using dedicated appliance controller display and load control circuitry 88. Thus, appliance communication controller 92 issues commands, via a high-speed communication bus (not shown), instructing dedicated appliance controller 80 to operate the appliance.

In embodiments in which data interruption is possible due to a low link 108 bandwidth, appliance communication controller 92 retains information as to status and completeness of data transfers over link 108. In alternative high-bandwidth embodiments, transmissions of large amounts of data, e.g. a new application program 90, are verified using a cyclic redundancy check or a checksum test and, in an event of a data transmission interruption or error, an entire data packet is retransmitted using the information retained by appliance communication controller 92 as described above.

Thus, appliance controls can be reconfigured by replacing the appliance control application program with new enhanced versions. The above described communication interface provides for remote upgrade and operation of an appliance, e.g. from the Internet or a local area network. Because an appliance can be upgraded by a manufacturer from the factory, by an appliance owner at home, and by a repair person upgrade costs are reduced and appliance flexibility and convenience are increased. Since the above interface also operates stand-alone, an appliance having no gateway requirement also can be networked.

While the invention has been described in terms of various specific embodiments, those skilled in the art will recognize that the invention can be practiced with modification within the spirit and scope of the claims.

What is claimed is:

1. A method for changing a control program that controls at least some low-level function commands of an appliance, the appliance including at least one electronic control that executes the control program, said method comprising:

connecting the electronic control to a communication device configured to communicate with at least one user device via a network; and changing the control program via the user device and the network to add new function commands using the low-level function commands.

2. A method in accordance with claim 1 wherein said connecting the electronic control to a communication device comprises connecting the appliance control to at least one of a modem, a power line carrier interface, and a serial port.

3. A method in accordance with claim 1 further comprising:

connecting a level-shift board to the electronic control; and connecting the level-shift board to a user device using a serial interface.

4. A method in accordance with claim 1 further comprising connecting the appliance to a local data concentrator.

5. A method in accordance with claim 4 further comprising connecting at least one additional appliance to the local data concentrator.

6. A method in accordance with claim 1 further comprising performing diagnostics on the appliance via the user device and the network.

7. A method in accordance with claim 1 further comprising communicating with the appliance from the user device via the network utilizing an encryption algorithm.

8. A method in accordance with claim 1 wherein said connecting the electronic control to a communication device comprises:

interfacing the electronic control with an appliance communication controller; and interfacing the appliance communication controller with an external host controller including a modem.

9. A method in accordance with claim 8 wherein said interfacing the electronic control with an appliance communication controller comprises connecting the electronic control to the appliance communication controller using a serial bus.

10. A method in accordance with claim 7 wherein said using the user device comprises using the user device to communicate with the appliance via the network utilizing at least one of a cyclic redundancy check and a checksum.

11. A method in accordance with claim 1 wherein said connecting the appliance to a communication device comprises:
   connecting the appliance control to a local data concentrator using a power line carrier interface; and
   connecting the data concentrator to a processor using a serial interface.

12. A method in accordance with claim 11 further comprising connecting at least one additional appliance to the data concentrator.

13. A method in accordance with claim 8 wherein said interfacing the appliance communication controller with an external host controller including the modem comprises connecting the appliance communication controller to the external host controller using a power line carrier interface.

14. A method in accordance with claim 8 wherein said interfacing the appliance communication controller with an external host controller including the modem comprises connecting the appliance communication controller to the external host controller using an infrared frequency interface.

15. A method in accordance with claim 8 wherein said interfacing the appliance communication controller with an external host controller including the modem comprises connecting the appliance communication controller to the external host controller using a wireless interface.

16. A method in accordance with claim 1 further comprising connecting the appliance control to a local processor accessible by an appliance user.

17. A method in accordance with claim 1 further comprising communicating with the appliance from the user device via the network utilizing a proxy protocol.

18. A method for operating an appliance controlled by a dedicated appliance controller interfacing with an appliance communication controller configured to interpret and transmit low-level function commands for operating the appliance to the dedicated appliance controller, the appliance communication controller connected to a modem, said method comprising:
   establishing a communication link with the appliance communication controller using the modem;
   supplying at least one new function command to the appliance communication controller using the communication link;
   interpreting the at least one new function command using the low-level function commands; and
   transmitting the at least one new function command to the dedicated appliance controller from the appliance communication controller.

19. A method in accordance with claim 18 wherein the dedicated appliance controller is programmable, said method further comprising of programming the dedicated appliance controller using the appliance communication controller.

20. A method in accordance with claim 19 wherein said programming the dedicated appliance controller comprises:
   inputting programming data to the appliance communication controller using the communication link and an external host controller; and
   transmitting the program data from the appliance communication controller to the dedicated appliance controller.

21. A method in accordance with claim 20 further comprising:
   querying by the appliance communication controller whether the dedicated appliance controller is in use; and
   transmitting the program data from the appliance communication controller to the dedicated appliance controller when the dedicated appliance controller is not in use.

22. A method in accordance with claim 18 further comprising operating at least one additional appliance using the external host controller.

23. A method in accordance with claim 18 further comprising commanding the dedicated appliance controller using the appliance communication controller.

24. A method in accordance with claim 23 wherein the communication link with the appliance communication controller is established using a local computer, said commanding the dedicated appliance controller further comprises:
   inputting commands to the appliance communication controller using the communication link;
   interpreting the commands with the appliance communication controller; and
   transmitting the interpreted commands from the appliance communication controller to the dedicated appliance controller.

25. A communication interface for operating an appliance controlled by a dedicated appliance controller, said interface comprising:
   an appliance communication controller interfacing with the dedicated appliance controller; and
   an external host controller interfacing with said appliance communication controller and configured to receive control data from an operator, said appliance communication controller further configured to:
   receive an extended function command;
   convert the extended function command into a low-level function command; and
   transmit the low-level function command to the dedicated appliance controller.

26. A communication interface in accordance with claim 25 wherein said appliance communication controller further comprises an appliance communication bus configured to interface with the dedicated appliance controller.

27. A communication interface in accordance with claim 26 wherein the appliance includes more than one dedicated appliance controller and said appliance communication bus further comprises a data transmission arbitration scheme.

28. A communication interface in accordance with claim 25 wherein said external host controller further comprises a gateway interface.

29. A communication interface in accordance with claim 25 wherein said external host controller further comprises a communication link interfacing with said appliance communication controller.

30. A communication interface in accordance with claim 29 wherein said external host controller is further configured to:
   generate appliance control instructions from the operator control data; and
   transmit the instructions to said appliance communication controller using said communication link.

31. A communication interface in accordance with claim 29 wherein said communication link comprises a power line carrier interface.

32. A communication interface in accordance with claim 25 wherein said external host controller is configured to receive control data from an operator for more than one appliance.

33. A communication interface in accordance with claim 25 wherein said appliance communication controller is configured to:
- accept programming data from said external host controller;
- query whether the dedicated appliance controller is in use; and
- transmit the programming data to the dedicated appliance controller when the dedicated appliance controller is not in use.

34. A communication interface in accordance with claim 33 wherein said appliance communication controller is further configured to:
- monitor a transmission of the programming data;
- interrupt the programming data transmission while the dedicated appliance controller is in use; and
- when the dedicated appliance controller is no longer in use, resume the interrupted programming data transmission from a point at which the transmission was interrupted.

35. A communication interface in accordance with claim 25 wherein said appliance communication controller is further configured to:
- receive programming data from said external host controller; and
- use the received programming data to issue commands to the dedicated appliance controller for operating the appliance.

36. A communication interface in accordance with claim 35 wherein said appliance communication controller is further configured to syntax-check the programming data.

* * * * *